United States Patent

Otsuka et al.

[11] Patent Number: 5,786,050
[45] Date of Patent: Jul. 28, 1998

[54] EASY OPENING POUCH

[75] Inventors: Yoshiaki Otsuka, Tokyo; Hiroshi Hasegawa; Shoji Ito, both of Yokohama; Hideaki Masuo, Tokyo, all of Japan

[73] Assignee: Toyo Seikan Kaisha, Ltd., Tokyo, Japan

[21] Appl. No.: 702,875

[22] Filed: Aug. 26, 1996

Related U.S. Application Data

[63] Continuation-in-part of Ser. No. 467,141, Jun. 6, 1995, abandoned, which is a continuation-in-part of Ser. No. 251,662, May 31, 1994, abandoned, which is a continuation-in-part of Ser. No. 2,495, Jan. 6, 1993, abandoned.

[51] Int. Cl.$^6$ ............................................. B29D 22/00
[52] U.S. Cl. ................... 428/35.2; 428/35.7; 428/475.8; 428/476.1; 428/515; 428/516; 428/910; 383/114; 383/121; 206/484
[58] Field of Search ..................... 428/35.2, 35.7, 428/475.8, 476.1, 515, 516, 910; 383/114, 121; 206/484

[56] References Cited

U.S. PATENT DOCUMENTS

| | | | |
|---|---|---|---|
| 4,178,738 | 12/1979 | Bell | 383/121 |
| 4,405,667 | 9/1983 | Christensen | 428/35 |
| 4,501,798 | 2/1985 | Koschak et al. | 428/349 |
| 4,578,316 | 3/1986 | Clauson et al. | 428/516 |
| 4,666,778 | 5/1987 | Hwo | 428/412 |
| 4,680,207 | 7/1987 | Murray | 428/35 |
| 4,687,688 | 8/1987 | Curie et al. | 428/35 |
| 5,091,241 | 2/1992 | Lang et al. | 428/516 |
| 5,093,189 | 3/1992 | Yamawaki | 428/220 |
| 5,182,168 | 1/1993 | Chu et al. | 428/330 |
| 5,209,972 | 5/1993 | Super et al. | 428/349 |

FOREIGN PATENT DOCUMENTS

| | | |
|---|---|---|
| 323629 | 7/1989 | European Pat. Off. . |
| 380111 | 8/1990 | European Pat. Off. . |
| 515745 | 12/1992 | European Pat. Off. . |
| 5-193079 | 8/1993 | Japan . |

*Primary Examiner*—Christopher Raimund
*Attorney, Agent, or Firm*—Beveridge, DeGrandi, Weilacher & Young, L.L.P.

[57] ABSTRACT

A multilayer laminated film pouch disclosed has an easy opening characteristics. The layers of the film is composed of an innermost film containing linear low density polyethylene, an intermediate film made of oriented polyolefin, an outermost film made of biaxially oriented nylon and/or PET.

9 Claims, 2 Drawing Sheets

EASY OPENING POUCH

REFERENCE TO RELATED APPLICATIONS

This application is a continuation-in-part of application Ser. No. 08/467,141 filed Jun. 6, 1995, now abandoned, which in turn is a continuation-in-part of application Ser No. 08/251,662 filed May 31, 1994, now abandoned, which in turn is a continuation-in-part of application Ser. No. 08/002,495 filed Jan. 6, 1993, now abandoned, which are relied on and incorporated herein by reference.

BACKGROUND OF INVENTION

The present invention relates to a pouch in which a product to be packaged, for example liquid detergent such as home detergent, household detergent or the like, a toiletry such as shampoo, rinse or the like, bath liquid or the like. More particularly, the invention relates to a pouch which has excellent shock-resistance and environmental stress cracking resistance, and which has a satisfactory easy tearability in the sense of being easily opened when desired. It also has rigidity so as to be suitable for packing therein liquid detergent to be refilled. Further, the present invention relates to a self supporting pouch having a sealed part which is prevented from deteriorating.

In the recent past, attempts at reuse of containers have been widely made in order to save resources. For example, liquid detergent to be refilled has been supplied with a simple package in order to reuse the container.

It is required for a pouch for refilling liquid detergent or the like to have some important features. One of the features is an easy tearability or easy opening characteristics. Usually, the pouch is manufactured by folding and superposing a film along its flowing direction. When the opening part of the pouch having a heat-sealed periphery and containing a folded and superposed biaxially oriented film is torn, a slip occurs in the tearing direction. In that event, a satisfactory opening cannot be formed. This causes a spill of the contents of the pouch. The reason for this problem has not yet been clarified completely.

A further required feature for these pouches is shock resistance. Breakage of a package due to shock caused by, for example, dropping during handling in the physical distribution process leads to many problems. Further, the environmental stress cracking resistance thereof is also important since packaging material experiences stress cracking as time passes if it is exposed to high atmospheric temperature in particular during the summer. This can lead to breakage of the package.

The stability of the seal is another important feature. In particular, a self-supporting pouch is subjected to loads at the sealed parts of the barrel and bottom sections thereof when placed in storage or during the physical distribution process. When this occurs the sealed parts deteriorate. The deterioration of the sealed parts is a specific phenomenon which would often occur in the case of packaging of liquid, and particularly would occur at a high atmospheric temperature during the summer. This phenomenon would not occur in the case of a liquid such as water other than detergent. From this fact, applicants postulate that this is a phenomenon caused by the surface active agent properties of the detergent acting on the sealed parts of the film in the innermost layer. The deterioration of the sealed parts of the barrel and bottom sections of the package decreases the seal area, causing lowering of the shock-proof strength of these parts. Accordingly, the possibility of breakage of the package become higher during handling thereof.

The above-mentioned characteristics cause serious problems to a pouch for refilling since a package for refilling is not to be repeatedly used in comparison with a container, but is discarded after refilling so that it has a structure which is simpler than that of the container which is repeatedly used in view of the prevention of problems in waste disposal.

Further, in view of the requirements for workability upon refilling of liquid detergent or the like and handling ability during physical distribution or refilling, the pouch has to have a certain rigidity. This problem can be solved by the present invention. Further, the self-supporting property and the rigidity become more satisfactory if a film which is formed by co-extruding a linear low density polyethylene and high density polyethylene together is used as the film for the barrel section of the pouch.

SUMMARY OF THE INVENTION

According to the present invention, one feature resides in an easy opening pouch formed of a laminated film, the laminated film being composed of:

a film (a) made of a composition containing linear low density polyethylene;

a film (b) made of oriented polyolefin having a first ratio MD/TD which is greater than 2, said first ratio is between a degree MD of orientation in a flowing (drawing or stretching) direction measured by an infrared dichroic process and a degree TD of orientation in a direction crossing the flowing direction; and a film (c) made of biaxilly oriented nylon and/or PET having a second ratio MD/TD which is 1.2 to 2.5, said second ratio is between a degree MD in a direction measured by an infrared dichroic process and a degree TD of orientation in a direction crossing the flowing direction;

wherein the film (a) serves as an innermost layer making contact with a product to be packaged therein, the film (b) serves as an intermediate layer, and the film (c) serves as the outer most layer.

In accordance with the invention, it is preferred that film (a) is formed of a composition composed of linear low density polyethylene and ethylene-butene-1-copolymer, or is a composition composed of linear low density polyethylene, low density polyethylene and ethylene-butene-1-copolymer, or is formed by co-extruding a composition of linear low density polyethylene, and high density polyethylene together. Preferably film (b) is formed of polyolefin made of at least one resin selected from a group consisting of polypropylene containing less than 2 wt. % of ethylene, and high density polyethylene having a density of higher than 0.945, or polyolefin made of a composition in which polypropylene containing less than 2 wt. % of ethylene and high density polyethylene having a density of higher than 0.945 are mixed together at a rate of higher than 80:20. Film (b) is preferably rolled and drawn.

Further, it is preferred that film (c) has coefficients of orientation measured by a fluorescent orientation process, which are $0.1 \leq 1 \leq 0.9$, $0 \leq m \leq 0.4$ and $0 \leq n \leq 0.9$.

Another embodiment of the invention features a self-supporting pouch formed of:

(A) a barrel section made of a multi-layer film which is lamination of:

a film (a) formed of a composition containing linear low density polyethylene;

a film (b) formed of oriented polyolefin having a first ratio MD/TD which is greater than 2 and said first ratio is between a degree of orientation in a flowing direction measured by an infrared dichroic process and a degree TD of orientation in a direction crossing the flowing direction; and a film (c) formed of biaxially oriented nylon and/or PET having a second ratio MD/TD which is 1.2 to 2.5, and said second ratio is between a degree MD of orientation in a flowing direction measured by an infrared dichroic process and a degree TD of orientation in a direction crossing the flowing direction; wherein the film (a) serves as the innermost layer adapted to make contact with the product to be packed, the film (c) serves as an intermediate layer and the film (c) serves as an outermost layer; and (B) a bottom section fused to a lower part of the barrel section (A) and made of a multi-layer film which is a lamination of:

a film (d) as an innermost layer formed of a composition of linear low density polyethylene and low density polyethylene; and a film (e) as an outermost layer formed of biaxially oriented nylon, wherein the bottom section formed of the multi-layer film is fused to the barrel section.

In this embodiment of the invention, it is preferred that film (a) is formed of a composition of linear low density polyethylene and ethylene-butene-1-copolymer, or a composition of linear low density polyethylene, low density polyethylene and ethylene-butene-1-copolymer, or is formed by co-extruding a composition of linear low density polyethylene, and high density polyethylene together.

Further, it is preferred that film (b) is formed of polyolefin made of at least one resin selected from a group consisting of polypropylene containing less than 2 wt. % of ethylene and high density polyethylene having a density of higher than 0.945, or polyolefin made of a composition in which polypropylene containing less than 2 wt. % of ethylene and high density polyethylene having a density of higher than 0.945 are mixed together at a rate of higher than 80:20. As mentioned above, film (b) is rolled and drawn in the preferred embodiments.

Also in this embodiment of the invention, it is preferred that film (c) has coefficients of orientation which are $0.1 \leq 1 \leq 0.9$, $0 \leq m \leq 0.4$ and $0 \leq n \leq 0.9$. Film (d) is formed of a composition of linear low density polyethylene, low density polyethylene and ethylene-butene-1-copolymer, or is formed by co-extruding a composition of linear low density polyethylene, and high density polyethylene together in the preferred aspect of the invention.

The easy opening pouches as set forth herein are especially useful for packaging of liquid detergent.

PREFERRED EMBODIMENTS

The following provides details of the invention.

A bag formed by heat-sealing a film is most popular and is made of a lamination of a biaxially oriented film as an outermost layer and unoriented film as an innermost layer in view of the strength required therefor. However, when the bag, which is formed by heat-sealing the laminated film after folding and superposing, is torn to open the bag in order to unseal the contents thereof, slippage occurs in the tearing direction between the two films superposed with each other. Accordingly, a satisfactory opening of the pouch cannot be achieved. This problem cannot be theoretically explained. That is, although it is considered that this is measured by the fact that the degree of biaxial orientation of the biaxially oriented film is different between its widthwise axial end part and its center part, a slip in the tearing direction between the upper and lower films becomes smaller if the degree of orientation in the film flowing direction is high even though they are superposed with each other. Even in this case, if the laminated film is torn from the other side, a slip in the tearing direction again occurs. Thus, the scientific clarification of the above-mentioned problem has not yet been sufficiently made.

Easy refilling, storage stability, handling ability and the like are required features that are important for the pouch to be useful for refilling. The easy refilling inevitably requires easy opening and unsealing.

Next, explanation will be made of the storage stability. A package undergoes stress cracking due to its storage environment, and accordingly, it is likely that the package is easily broken. Accordingly, it is necessary to enhance the environmental stress cracking resistance.

Further, it is necessary to increase the shock-proof strength. Should the pouch be broken due to dropping during transportation, the resulting contamination of the surroundings causes a serious problem.

Next, it is required that the surface of the pouch which makes contact with the contents thereof such as liquid detergent or the like be inert to the contents. Thus, according to the present invention, the lamination film which will be explained hereinbelow is used so as to form a package.

The linear low density polyethylene (which will be hereinbelow denoted as "LLDPE") in the innermost layer is tough so that the propagation of rupture is low, and the high density polyethylene (which will be hereinbelow denoted as "HDPE") enhances the shock resistance. However, since the HDPE has a disadvantage in that its environmental stress caused by detergent is large, it is necessary to position it so as to prevent it from making contact with the detergent.

Further, the ethylene-butene-1-copolymer (which will be hereinbelow denoted as "Et-Bu") is effective to exhibit improved environmental stress cracking and container tearability, but its heat-resistance is low. Accordingly, if the contents thereof is large, the sealing stability decreases in the summer in a region where the atmospheric temperature is high. The result is deterioration of a sealed part or peel-off of the sealed part due to soaking of the package material from the inside, so that the sealed part tends to shrink in its width.

According to the present invention, a film which is obtained by co-extruding a composition containing LLDPE and the Et-Bu, and the HDPE together, can be positioned in such a manner that the LLDPE composition side defines a surface adapted to make contact with the detergent. The innermost layer film may be a co-extruded film composed of an LLDPE composition layer and an HDPE layer, and also a co-extruded film in which an HDPE layer is interposed between two LLDPE composition layers. Further, the number of layers can be increased, but a composition containing LLDPE should be used for the surface adapted to make contact with detergent since HDPE deteriorates in its environmental stress cracking resistance (which will be herein below denoted as "ESC") when it makes contact with detergent, as mentioned above.

In the case of the co-extruded film in which an HDPE layer is interposed between two LLDPE layers, the thicknesses of the two LLDPE layers may be equal to each other, but the thickness of one of them which is adapted to make contact with detergent may be greater than that of the other. The LLDPE layer having more than 20μ which is adapted to make contact with detergent, makes the ESC satisfactory.

If a blend containing Et-Bu is used as LLDPE for the LLDPE layer, it is possible to enhance the shock-proof strength. This blends contains 40 to 90 wt. % of LLDPE and 10 to 60 wt. % of Et-Bu.

If HDPE is used as a constituent in the co-extruded film, the rigidity increases so that the self supporting ability is satisfactory, and accordingly, the refilling by a consumer is facilitated. Further, handling in the shop is more convenient. Also, the filling of detergent into the refillable pouch is facilitated so that the workability is satisfactory. Since the HDPE layer having less than 20μ cannot satisfactorily enhance the rigidity, it is preferable to have a thickness of larger than 20μ.

It is important that HDPE exists in the co-extruded film. A film in which HDPE and LLDPE are blended has a function which is an arithmetic mean of them, and accordingly, the rigidity cannot be increased so that the ESC reduces. However, if they are extruded together, the function of HDPE and the function of LLDPE can be maintained respectively, and accordingly, a peculiar effect can be advantageously exhibited. The melt index is 1.0 to 7.0 for LLDPE, 0.5 to 7.0 for HDPE and 1.0 to 7.0 for Et-Bu, and the specific weight is 0.900 to 0.940 for LLDPE and 0.917 to 0.930 for HDPE. Further, the content value of Butene-1 in Et-Bu is 5.0 to 30 wt. %.

Further, the present invention also includes a pouch formed of a lamination using monoaxial oriented film made of a blend composed of two components, that is LLDPE and Et-Bu or a blend composed of three components, that is, low density polyethylene (which will be hereinbelow denoted as "LDPE") is added to the above-mentioned two components. This blend is composed of 10 to 80 wt. %, preferably 20 to 60 wt. % of LLDPE, 10 to 50 wt. % of LDPE, 10 to 40 wt. % of Et-Bu. Further, the melt index is 1.0 to 7.0 for LLDPE, 0.5 to 7.0 for LDPE and 1.0 to 7.0 for Et-Bu, and the specific weight is 0.900 to 0.940 for LLDPE and 0.917 to 0.930 for LDPE while the content value of butene-1 in Et-Bu is 5.0 to 30 wt. %. Further, the melt index of the blend itself is 1.0 to 7.0.

If the blended film is used as the innermost layer, the propagation of rupture is lower since LLDPE in the blended film is tough, and accordingly it is possible to enhance the shock resistance. However, if the amount of LDPE is decreased, the film can hardly be cut upon tearing. Further, LDPE has a disadvantage in that the possibility of environmental stress cracking caused by detergent is high. Further, although Et-Bu exhibits an environmental stress cracking resistance and tearability of the container, it is inferior in heat resistance. Thus, a large content of Et-Bu tends to deteriorate the stability of tearing during the summer or in a tropical zone where the atmospheric temperature is high.

Further, an oriented film which is obtained by drawing polypropylene containing less than 2.0 wt. % of ethylene, high density polyethylene having a density of higher than 0.945 or a blend composed of the above-mentioned polypropylene and high density polyethylene and having a blend proportion of 100/0 to 80/20, strongly oriented in the flowing direction MD, and which has an orientation ratio MD/TD ≧2.0 (where MD is in the flowing direction and TD is in the widthwise direction) and a rupture strength ratio MD/TD ≧2.0, given by an infrared dichroic process, is used as the intermediate layer. Polyolefin in the intermediate layer has a specific orientation ratio and rupture strength ratio so that the orientation in one direction is large, and accordingly, serves the role of preventing slippage in the tearing direction so that the easy opening feature can be obtained.

The MD/TD ratio referred to herein is measured by an infrared dichroic process known in the art. It is described in a book entitled: "INTERNAL REFLECTION SPECTROSCOPY" authored by N. J. Harrick published by Interscience Publishers in 1967. Pages 239–243, thereof which describe the "dichroic ratio" are relied on and incorporated herein by reference.

As is known in the art, when a polymer film is extended, the molecules of the film are arranged in order, and an optical anisotropy arises. Upon irradiation of the film with polarized light, the light is strongly absorbed, if its electric field spectrum coincides with the direction of dipole moment of molecular vibration. The polarized light, on the other hand, is not absorbed if its electric field spectrum orthogonally crosses the direction of dipole moment of molecular vibration. This measurement process is called an infrared dichroic process. By irradiating the films with polarized infrared light, molecular structures, molecular orientations (conditions of molecular chain alignments), degrees of molecular orientations and crystal structures can be analyzed.

Polarized light may be easily produced by placing a polarizer composed of silver chloride films, to which characteristics of Brewster's angle is utilized, across the light line. Alternatively, a wire-grid polarizer or photoelasticity modulator may be used to produce polarized light.

Orientation degree based on measurements using the infrared dichroic process is the value obtained form the following equation, namely, orientation degree obtained based on the absorption peaks detected at light having a wave number of 841 $cm^{-1}$:

$$\text{Orientation degree} = I2/I1 = TD/MD$$

$$MD/TD \text{ ratio} = I1/I2$$

I1 = Absorption peak using polarized light and irradiating parallel with the machine direction (i.e., in the MD).

I2 = Absorption peak using polarized light and irradiating transverse to the machine direction (i.e., in the TD).

A nylon film or PET film whose biaxial orientation is near to the flowing direction, having coefficients of orientation by a fluorescent orientation process, which are $0.1 \leq l \leq 0.90$, $0 \leq m \leq 0.40$ and $0 \leq n \leq 0.90$, and having an orientation ratio MD/TD=1.2 to 2.5 given by an infrared dichroic process is used as the outermost layer.

As to the fluorescence orientation process, this is described in Nishijima et al, *Fluorescence Method for Studying Molecular Orientation in Polymer Solids*, Journal of Polymer Science: Part C, No. 15, pp. 237–250 (1966), and Pinaud et al, *Orientation measurements during drawing of polypropylene by fluorescence polarization microscopy*, Polymer 1982, Vol. 23, Oct. 1982, Butterworth and Co. (publishers) Ltd. These articles generally explain fluorescence orientation process, and are incorporated herein by reference.

As is known in the art, fluorescence orientation process is a process for analyzing orientation conditions of polymer non-crystalline chains, by dispersing fluorescence molecules into the polymer non-crystalline area. The difference of this fluorescence method from the infrared absorption dichroic method described above is the use of a optical double anisotropy which occurs when light is absorbed and fluorescence is emitted. By measuring the double anisotropy, the orientation form may be directly analyzed. For the purpose of measuring the double anisotropy, two polarized light plates are used in such a manner that polarized light intensities are measured by placing these two plates in the parallel direction and in the transverse direction. Then an angle distribution is calculated by using the intensity values which are thus measured.

The angle distribution of fluorescence polarized light intensity $I_{||}(\omega)$ are defined by the following equation which are known in the art:

$$I_{||}(\omega)=K\phi(l\cos^4\omega+m\sin^4\omega+(\tfrac{3}{8})n)$$

$$l+m+n=1$$

In this equation, $\omega$, $K$, $\phi$, and each of orientation coefficients of 1, m and n are defined as follows:

$\omega$ is an angle of a specimen;

K is a maximum excitation probability when a molecular axis and an electric spectrum of excited light are in parallel;

$\phi$ is a molecular fluorescence absorption degree;

l is a parameter that indicates the degree of orientation in the machine direction (MD) which is parallel to the film forming direction;

m is a parameter that indicates the degree of orientation in the transverse direction (TD) which is transverse to the film forming direction; and n is a parameter that indicates the degree of non-orientation in a film face.

To obtain an orientation degree, values of K and $\phi$ are not necessary to be obtained.

For example, if $\omega=0°$, 45° or 90°, the value of $I_{||}(0°)$, $I_{||}(45°)$ and $I_{||}(60°)$ are each obtained by the calculation. Finally, 1, m and n will be obtainable by solving simultaneous equations:

$$I_{||}(0°)=a=K\phi(l\cos^4 0°+m\sin^4 0°+(\tfrac{3}{8})n)$$

$$I_{||}(45°)=b=K\phi(l\cos^4 45°+m\sin^4 45°+(\tfrac{3}{8})n)$$

$$I_{||}(90°)=c=K\phi(l\cos^4 90°+m\sin^4 90°-(\tfrac{3}{8})n)$$

In this condition, 1, m, n and $K\phi$ can be expressed as follows:

$l=\tfrac{3}{4}\cdot(3a-4b+c)/(a+2b+c)$ $m=\tfrac{3}{4}\cdot(a-4b+3c)/(a+2b+c)$ $n=2\cdot(-a+4b-c)/(a+2b+c)$ $K\phi(a+2b+c)/3$ If there is no orientation in a film face, l=m=o, and n=1.
If there is a perfect single axis orientation, then, $l=\tfrac{3}{4}\cdot(-4b+c)/(2b+c)$ $m=\tfrac{3}{4}\cdot(-4b+3c)/(2b+c)$ $n=2\cdot(4b-c)/(2b+c)$.

If there is a perfect orthogonal dual-axis orientation, then, $l=m=\tfrac{1}{2}\cdot(a-b)/(a+b)$ $n=(-a+2b)/(a+b)$ The outermost layer, which can be either nylon film or PET film, or laminated film of both nylon and PET films, has a biaxial orientation and is near to the flowing direction of the film, and accordingly, has specific orientation coefficients and a specific orientation ratio. Therefore, it has been confirmed by experiments that slippage becomes very small in the tearing direction even with the lamination thereof. However, the reason why the slippage in tearing becomes smaller has not yet been scientifically clarified.

In the case of a self-supporting pouch, that is, a pouch used in its standing posture, one and the same material can be used for the barrel and bottom sections thereof. However, it is advantageous to use such a layered structure that rolled and drawn polyolefin forming the intermediate layer is removed, in view of the shock resistance.

The use of a composition containing LLDPE and Et-Bu as a material for the bottom section exhibits a special effect. The innermost layer of the film of the bottom section is fused to the innermost surface of the film of the barrel section. In this arrangement, the presence of Et-Bu on the innermost surface of the bottom section can satisfactorily prevent deterioration of the seal. The presence of Et-Bu in both barrel and bottom section is preferable in order to prevent deterioration tearing.

500 g of liquid detergent (MORE (trade name) produced by Kaoh Co., Ltd.) was charged and sealed in the above-mentioned pouch.

In the innermost layer film of the bottom section, which is a blend of linear low density polyethylene, low density polyethylene and Et-Bu, the proportion of the linear low density polyethylene is 20 to 80% of the entire layer, and preferably 30 to 70%, the proportion of the low density polyethylene is 10 to 30%, and the proportion of the Et-Bu is 10 to 40% and preferably 20 to 30%. Thus, it is a feature that the content of the linear low density polyethylene is larger than that in the film of the barrel section, but the content of the low density polyethylene is smaller than that in the latter.

Further, the presence of Et-Bu not only enhances the environmental stress cracking resistance but also stabilizes the heat-sealed part of the barrel and bottom section films. Accordingly, it is possible to prevent deterioration of tearing characteristics. Pouches filled with the detergent are held in a standing posture throughout transportation, storage and display in a shop. Accordingly, the load exerted by the detergent is always applied to the sealed parts of the bottom and barrel sections.

With the coming of summer when temperatures rise the deterioration of the tearing property becomes remarkable. A pouch which uses the film according to the present invention, as a material for the bottom section, has a satisfactory stability with no deterioration of tearing.

A co-extruded film which has been formed by co-extruding linear low density polyethylene and high density polyethylene together, is used as the film (d) for the innermost layer of the bottom section. The co-extruded film possesses properties so as to have a high rigidity, and accordingly, the bottom can have a satisfactory shape.

A biaxially oriented nylon film is used for the outermost layer of the bottom section, but the same nylon film as used for the barrel section can be used therefor.

The layers of the laminated film which form the barrel section are all coupled so as to exhibit a satisfactory effect. The film layer (a) preferably has a thickness of 100 to 150μ. If the layer is thin; i.e. less than 50μ, the ESC is lower. Further, the film layer (b) having a thickness of 15 to 30μ exhibits a satisfactory tearability. The film layer (c) having a thickness of 15 to 25μ exhibits an excellent drop strength.

In the laminated film forming the bottom section, the film layer (d) preferably has a thickness of 100 to 150μ. In this range, it exhibits a tearing deterioration resistance and an ESC. Further, the film layer (e) having a thickness of 15 to 25μ exhibits a satisfactory drop strength.

The method of manufacturing a standing pouch according to the present invention will now be described. The film for forming the barrel section is folded widthwise, and the film for forming the bottom section, which has been folded widthwise, is interposed in an opening in the widthwise end part of the former with the opening directions thereof being aligned together. Then, the heat seal parts of the bottom and barrel films are heat-sealed. Simultaneously, the barrel section is heat-sealed. Then, the opening is cut, and accordingly, the formation of the pouch is completed. The above-mentioned method is well known as the so-called side seal method.

It is natural that two films may be used, being superposed with each other, for the barrel section, instead of using one folded film.

If the bottom section film and the barrel section film are heat-sealed so as to have arcuate sealed parts, the opening thereof is satisfactory.

Figure 1:
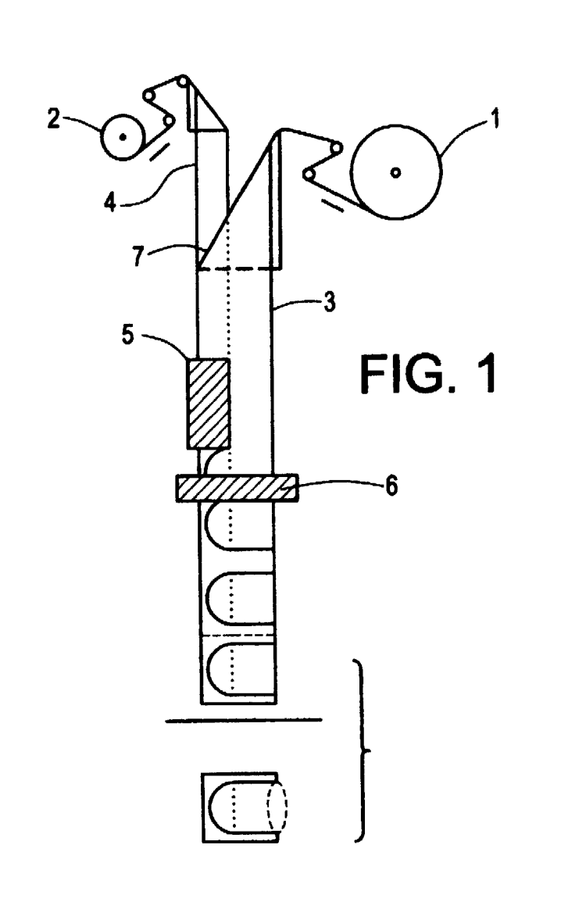
FIG. 1 is a schematic view illustrating the making of an easy opening pouch according to the present invention.

FIG. 1 shows a process of manufacturing an easy opening pouch having a bottom section according to the present invention. In this figure, there is shown a film 1 forming the barrel section of the pouch, which is folded by a triangular holding member 9, and is then fed out, having a side 3 opened. The fold edge part of the film 1 is cut by a slitter at a position 7 so that two superposed films are obtained. Reference numeral 2 denotes a film forming the bottom section, which is similarly folded and which is then inserted between the cut parts of the barrel section film, and is fed out, having a side 6 opened. Reference numeral 5 is a heat seal bar for fusing the bottom section film and the barrel section film together so as to form the bottom section. If the bottom section has an arcuate shape, the self supporting structure of the pouch is satisfactory. Reference numeral 6 denotes a heat seal bar for heat sealing a side seal part. After the completion of the side seal part, a cut is made substantially at the center of the side seal part, and in that way, individual respective pouches are formed.

Figure 2:
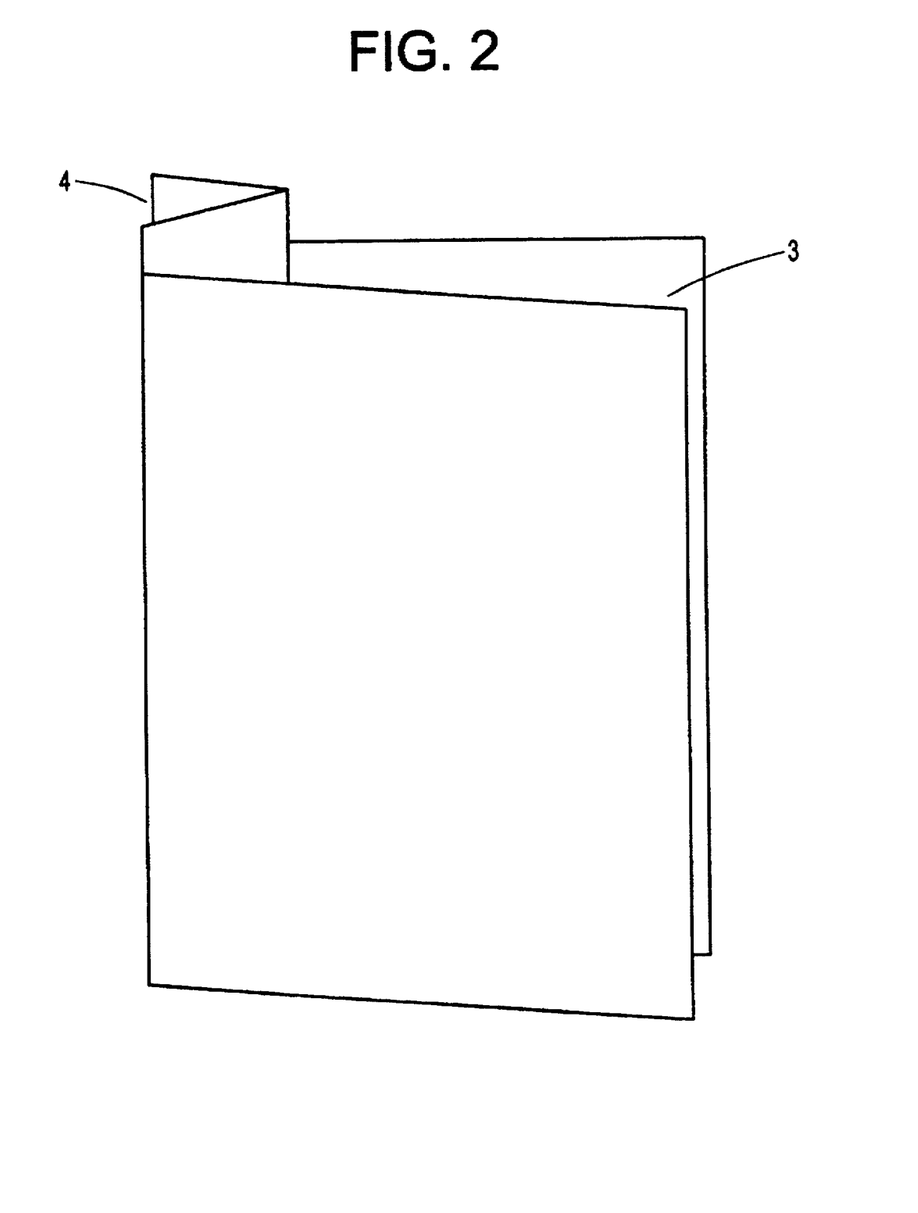
FIG. 2 is an enlarged view illustrating the barrel section into which the bottom section is inserted.

FIG. 2 is an enlarged view which shows a condition such that the bottom section film is inserted between the barrel section films.

Figure 3:
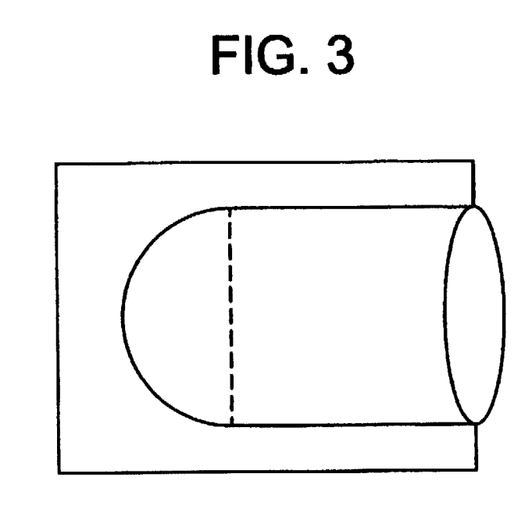
FIG. 3 is a perspective view illustrating a complete pouch.

FIG. 3 illustrates one of the pouches which are separated from each other.

Although it has been explained that detergent to be refilled is used as a product to be packaged, any type of product such as foods or the like can be packed in this pouch. Instead of using the pouch as a standing pouch for refilling, it can be used as a conventional standing pouch for packing.

REFERENCE EXAMPLE 1

A standing pouch having a length of 260 mm and a width of 120 mm with a 33 mm width fold for forming the bottom section was formed, by heat-sealing, of a three layer lamination sheet composed of:

a film having a thickness of 130μ and an MI of 4.0 and made of a blend composed of 40 wt. % of LLDPE, 30 wt. % of LDPE, and 30 wt. % of Et-Bu (TOUGHMER A#4085 (trade name) manufactured by Mitsui Petro Chemical Co., Ltd.);

a film which is monoaxial oriented homopolypropylene film having a thickness of 20μ and having an orientation ratio MD/TD measured by an infrared dichroic process, which is 3.0 and a film which a biaxially oriented nylon film having a thickness of 15μ and having an orientation ratio MD/TD measured by an infrared dichroic process, which is 1.6. Then, 500 g of liquid detergent (NEW BEAD (trade name) manufactured by Kaoh Co., Ltd) was charged and sealed in the pouch as a pouch for refilling.

REFERENCE EXAMPLE 2 to 4

Pouches for refilling were formed, similar to the reference example 1 using films shown in Table 1.

PET was used for the outermost layer of the reference example 3. A laminated film consisting of a PET film and a nylon film was used for the outermost layer of the reference example 4.

COMPARISON EXAMPLE 1 to 6

Pouches were formed, similar to the reference example 1, using films shown in Table 1.

REFERENCE EXAMPLE 5

As shown in Table 2, a self supporting pouch having a length of 260 mm and a width of 120 mm with a 33 mm width bottom fold was formed of a laminated film for forming the barrel section thereof and a laminated film for forming the bottom section thereof:

The laminated film for forming the barrel section was composed of:

a film (a) having a thickness of 130μ and formed of a blend containing 30 wt. % of LLDPE, 40 wt. % of LDPE and 30 wt. % of Et-Bu (TOUGHMER A#4085 manufactured by Mitsui Petro Chemical Co., Ltd.);

a film (b) which was monoaxial oriented homopolypropylene film having a thickness of 20μ and having an orientation ratio MD/TD measured by an infrared dichroic process, which is 3.0; and a film (c) which was a biaxially oriented nylon film having a thickness of 15 and having orientation coefficients determined by a fluorescent orientation process, which are l=0.3, m=0.1 and n=0.6, and an orientation ratio MD/TD measured by an infrared dichroic process, which is 1.6.

The laminated film for forming the bottom section was composed of:

a film (d) having a thickness of 150μ and formed of a blend containing 50 wt. % of LLDPE, 20 wt. % of LDPE and 30 wt. % of Et-Bu (TOUGHMER A#4085); and a biaxially oriented nylon film (e).

The laminated film for forming the barrel section was folded widthwise and superposed while the film (a) is use as the innermost layer, and the laminated film for forming the bottom section was folded widthwise and then superposed. The laminated film for forming the bottom section was then inserted into one widthwise end opening of the laminated film for forming the barrel section with their opening directions being aligned, and then the bottom section peripheral edge and the barrel section peripheral edge are heat-sealed.

REFERENCE EXAMPLES 6 to 7

Pouches for refilling were formed, similar to the reference example 5, using films shown in Table 2 for the innermost surfaces of the barrel and bottom sections thereof.

REFERENCE EXAMPLES 9 TO 10

Pouches for refilling were formed, similar to the reference example 5, using films formed by co-extruding a blend containing 60% of LLDPE and 40% of Et-Bu together with HDPE, for the innermost surfaces, instead of the above-mentioned LLDPE blend.

COMPARISON EXAMPLES 7 TO 9

Pouches were formed, similar to the reference example 5, using film shown Table 2 for the innermost surfaces.

10 times, and then, the breakage was examined. The results of the drop strength test are shown in Table 1 in which each number indicates the number of broken pouches.

TABLE 1

|  | Outside Layer | | | | Inter medial Layer | Polyolefin Film | | | Tear- | | Drop |
|---|---|---|---|---|---|---|---|---|---|---|---|
|  | l | m | n | MD/TD | MD/TD | LLDPE | LDPE | Et-Bu | ability | ESC | Strength |
| Reference Example 1 | 0.3 | 0.1 | 0.6 | 1.6 | 3 | 40 | 30 | 30 | o | o | 0 |
| Reference Example 2 | 0.3 | 0.1 | 0.6 | 1.6 | 3 | 30 | 40 | 30 | o | o | 0 |
| Reference Example 3 | 0.3 | 0.1 | 0.6 | 1.6 | 3 | 40 | 30 | 30 | o | o | 0 |
| Reference Example 4 | 0.3 | 0.2 | 0.5 | 1.4 | 3 | 40 | 30 | 30 | o | o | 0 |
| Comparison Example 1 | 0.3 | 0.1 | 0.6 | 1.6 | 3 | 100 | 0 | 0 | x | o | 0 |
| Comparison Example 2 | 0.3 | 0.1 | 0.6 | 1.6 | 3 | 0 | 100 | 0 | o | x | 11 |
| Comparison Example 3 | 0.3 | 0.1 | 0.6 | 1.6 | 3 | 0 | 0 | 100 | o | x | 9 |
| Comparison Example 4 | 0.3 | 0.1 | 0.6 | 1.6 | 3 | 0 | 50 | 50 | o | x | 28 |
| Comparison Example 5 | 0.3 | 0.1 | 0.6 | 1.6 | 1.5 | 40 | 30 | 30 | *1 Δ | o | 0 |
| Comparison Example 6 | 0.1 | 0.1 | 0.8 | 0.8 | 3 | 40 | 30 | 30 | Δ | o | 0 |

Notes to Table 1:
1. Tearability: Opening forces are small, and less slip occurs between the front and rear sides of a pouch.
2. Dropping Strength: each number indicates a number of broken pouches.
3. *1: The tearing force was small but slipping was large (more than 7 mm).

COMPARISON TESTS

Reference examples 1 to 3 and the comparison examples 1 to 6 were used.

TEST 1

Tearability Test

The degree of tearing ease and slippage between the front and rear sides of each pouch were examined by forming a small cut in the end part of the sealed part of the opening of the pouch and then tearing the sealed part in the widthwise direction. The tearability results are shown in Table 1 in which the mark "O" indicates that the tearing is easy and no slipping occurs, "Δ" indicates that tearing is easy although more or less slipping occurs, and the "X" indicates that the tearing is difficult and the slipping occurs.

TEST 2

Environment Stress Cracking (ESC) Test

Occurrence of cracks was examined after the pouches were held in an atmosphere at a temperature of 65° C. for three days.

The results of the test were shown in Table 1 in which the mark "X" indicates that leakage occurs, or deterioration of sealing occurs although no leakage occurs.

TEST 3

Shock Test

Fifty pouches in each example were dropped onto a concrete surface from a height of 1.2 m with repetitions of

TEST 4

Stiffness Test

The stiffness of the laminated film of each pouch was measured with the use of a taper type stiffness tester in its entirety.

It was considered that a suitable stiffness value is 11.0 to 16.0 in view of the handling ability in physical distribution and the workability during filling.

EVALUATION

If the film made of a blend containing LLDPE, HDPE and Et-Bu is used as the innermost layer film, the tearability, the ESC and the drop strength are all excellent.

However, if the thickness of the LLDPE blend for the innermost layer film is less than 2.0μ the ESC tends to deteriorate. If the content of LLDPE in the innermost layer film (a) in each of the barrel and bottom section of the pouch is less than 20%, the ESC deteriorates. Further, if no Et-Bu is present in the film (a), the retardation of tearing becomes larger. Further, the drop strength also is lower.

The reference examples 9 and 10 in which a film formed by co-extruding a blend composed of LLDPE, HDPE and Et-Bu together with HDPE was used as the innermost layer, exhibit features substantially the same as those of the other reference examples, and also exhibit a satisfactory stiffness.

|  | Barrel Section Film LLDPE/LDPE/ET-BU | | | Bottom Section Innermost Film LLDPE/LDPE/Et-Bu | | | Terability | Seal Deterioration | ESC | Drop Strength |
|---|---|---|---|---|---|---|---|---|---|---|
| Reference Example 5 | 30 | 40 | 30 | 50 | 20 | 30 | o | o | o | 0 |
| Reference Example 6 | 30 | 40 | 30 | 70 | 0 | 30 | o | o | o | 0 |
| Reference Example 7 | 30 | 40 | 30 | 50 | 20 | 30 | 0 | o | o | 0 |
| Reference Example 8 | 30 | 40 | 30 | 30 | 40 | 30 | 0 | o | o | 0 |
| Reference Example 9 | 30 | 40 | 30 | Co-Extruded Film | | | o | o | o | 0 |
| Reference Example 10 | Co-Extruded Film | | | Co-Extruded Film | | | o | o | o | 0 |
| Comparison Example 7 | 10 | 60 | 30 | 10 | 60 | 30 | 0 | x | x | 0 |
| Comparison Example 7 | 30 | 40 | 30 | 10 | 60 | 30 | o | x | x | 0 |
| Comparison Example 10 | 30 | 40 | 30 | 30 | 70 | 0 | o | x | o | 32 |

Notes to Table 2:
1. Tearability: tearing forces are small and less slippage occurs between the front and rear sides of a pouch; and
2. Each number denotes the number of broken pouches.

COMPARISON TEST Reference example 5 to 10 and comparison example 7 to 9 were used.

TEST 5

Tearability Test

A test similar to Test 5 was carried out. The results of the tests are shown in Table 2 in which the mark "O" indicates that the tearing is easy and no slipping occurs, while the mark "Δ" indicates that the sealed part deteriorates although no leakage occurs, that is, the sealed part peels off due to soaking of the contents from the inside of the package so that the width of the seal part decreases.

TEST 7

Shock Test

Fifty pouches in each example were dropped onto a concrete surface from a height of 1.2 m with repetitions of 10 times, and then, the breakage was examined. The results of the test were shown in Table 1 in which each number indicates the number of broken pouches.

EVALUATION

It is considered that the tearability, the ESC and the drop strength of pouch are all excellent if the blended film is used as the innermost layer.

The pouch for refilling detergent, according to the present invention, has a shock-proof strength and an environmental stress cracking resistance which are large, and is excellent in tearability and satisfactory in tearing stability, and therefore it very useful for refilling.

Further variations and modifications of the foregoing will be apparent to those skilled in the art and are intended to be encompassed by the claims appended hereto.

What is claimed is:

1. An easy opening pouch formed of a laminated film, the laminated film being composed of a film (a) formed of a composition composed 20% to 60% of linear low density polyethylene, 10 to 50% of low density polyethylene and 10 to 40% of ethylene-butene-1-copolymer;

a film (b) made of oriented polyolefin having a first ratio MD/TD which is 2 or greater, said first ratio MD/TD is between a degree MD of orientation in a flowing direction measured by an infrared dichroic process and a degree TD of orientation in a direction crossing the flowing direction, and a film (c) made of biaxially oriented nylon having a second ratio MD/TD between 1.2 and 2.5, said second ratio MD/TD is between a degree MD of orientation in a flowing direction measured by an infrared dichroic process and a degree TD of orientation in a direction crossing the flowing direction;

wherein the film (a) serves as a innermost layer making contact with a product to be packaged, the film (b) serves as an intermediate layer, and the film (c) serves as outermost layer wherein the film (c) has coefficients of a orientation measured by a fluorescent orientation process which are $0.1 \leq 1 \leq 0.9$, $0 \leq m \leq 0.4$ and $0 \leq n \leq 0.9$.

2. The pouch as set forth in claim 1, wherein the film (b) is formed of polyolefin made of at least one resin selected from the group consisting of polypropylene containing less than 2 wt. % of ethylene, and high density polyethylene having a density of higher than 0.945.

3. The pouch as set forth in claim 1, wherein the film (b) is formed of polyolefin made of a composition in which polypropylene containing less than 2 wt. % of ethylene and high density polyethylene having a density of higher than 0.945 are mixed together at a rate of higher than 80:20.

4. The pouch as set forth in claim 1, wherein the film (b) is rolled and drawn.

5. An easily opening and self-supporting pouch comprising:

A: a barrel section made of a multi-layer film which is lamination of:

a film (a) formed of a composition composed of 20% to 60% of linear low density polyethylene, 10 to 50% of low density polyethylene and 10 to 40% of ethylene-butene-1-copolymer;

a film (b) formed of oriented polyolefin having a first ratio MD/TD which is equal to 2 or greater, said first ratio is between a degree MD of orientation in a flowing direction measured by an infrared dichroic process and a degree TD of orientation in a direction crossing the flowing direction; and a film (c) formed of biaxially oriented nylon having a second ratio MD/TD which is 1.2 to 2.5, said second ratio MD/TD is between a degree MD of orientation in a flowing direction measured by an infrared dichroic process and a degree TD of orientation in a direction crossing the flowing direction;

wherein the film (a) serves as an innermost layer adapted to make contact with a product to be packed, the film (b) serves as an intermediate layer and the film (c) serves as an outermost layer; and B: a bottom section fused to a lower part of the barrel section and made of a multi-layer film which is lamination of:

a film (d) as an innermost layer formed of a composition of 20 to 80% linear low density polyethylene, 10 to 30% low density polyethylene and 10 to 40% ethylene-butene-1-copolymer; and a film (e) as an outermost layer formed of biaxial oriented nylon wherein the bottom section formed of the multi-layer film is fused to the barrel section, wherein the film (c) has coefficients of orientation measured by a fluorescent orientation process, which are $0.1 \leq 1 \leq 0.9$, $0 \leq m \leq 0.4$ and $0 \leq n \leq 0.9$.

6. The pouch as set forth in claim 5, wherein the film (b) is formed of polyolefin made of at least one resin selected from a group consisting of polypropylene containing less than 2 wt. % of ethylene and high density polyethylene having a density of higher than 0.945.

7. The pouch as set forth in claim 5, wherein the film (b) is formed of polyolefin made of a composition in which polypropylene containing less than 2 wt. % of ethylene and high density polyethylene having a density of higher than 0.945 are mixed together at a rate of higher than 80:20.

8. The pouch as set forth in claim 5 wherein the film (b) is rolled and drawn.

9. An easily opening pouch as set forth in claim 5, containing liquid detergent.

* * * * *